(12) United States Patent
Knezevic et al.

(10) Patent No.: US 11,689,126 B2
(45) Date of Patent: Jun. 27, 2023

(54) METHOD FOR DETERMINING THE ANGLE OF THE ROTOR OF AN ELECTRIC MOTOR CONTROL UNIT AND VEHICLE

(71) Applicant: Bayerische Motoren Werke Aktiengesellschaft, Munich (DE)

(72) Inventors: Jovan Knezevic, Munich (DE); Roman Nestlinger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 85 days.

(21) Appl. No.: 17/427,322

(22) PCT Filed: May 5, 2020

(86) PCT No.: PCT/EP2020/062396
§ 371 (c)(1),
(2) Date: Jul. 30, 2021

(87) PCT Pub. No.: WO2020/249313
PCT Pub. Date: Dec. 17, 2020

(65) Prior Publication Data
US 2022/0140759 A1    May 5, 2022

(30) Foreign Application Priority Data

Jun. 11, 2019  (DE) ..................... 10 2019 115 787.0

(51) Int. Cl.
*H02P 6/18* (2016.01)
*H02P 101/45* (2016.01)
*G06F 17/11* (2006.01)

(52) U.S. Cl.
CPC ............... *H02P 6/18* (2013.01); *G06F 17/11* (2013.01); *H02P 2101/45* (2015.01); *H02P 2203/01* (2013.01)

(58) Field of Classification Search
CPC .... H02P 6/18; H02P 2101/45; H02P 2203/01; H02P 6/16; G06F 17/11; G01D 5/24476
(Continued)

(56) References Cited

U.S. PATENT DOCUMENTS 7,180,263 B2 * 2/2007 Maeda ..................... H02P 6/10
                                                        318/807
8,947,032 B2 * 2/2015 Nee .......................... H02P 6/188
                                                        318/400.32
(Continued)

FOREIGN PATENT DOCUMENTS

DE  10 2018 001 851 A1  9/2018
JP  2017-153338 A       8/2017
WO  WO 2014/031166 A1   2/2014

OTHER PUBLICATIONS

International Search Report (PCT/ISA/210) issued in PCT Application No. PCT/EP2020/062396 dated Jul. 20, 2020 with English translation (five (5) pages).
(Continued)

*Primary Examiner* — David Luo
(74) *Attorney, Agent, or Firm* — Crowell & Moring LLP (57) ABSTRACT

A method for determining the angle of the rotor of an electric motor includes receiving a first rotor position signal from a rotor position sensor by using a control unit, the first rotor position signal including a plurality of orders; determining the angular velocity of the electric motor at least by way of the first rotor position signal by using an angular velocity module of the control unit; determining a first base signal by way of the determined angular velocity and the first rotor position signal by using a first filter module of the control unit; and determining the angle of the rotor at least by way of the determined first base signal by using an angle module of the control unit.

19 Claims, 3 Drawing Sheets

(58) Field of Classification Search
USPC .......................................... 318/652, 638, 560
See application file for complete search history.

(56) References Cited

U.S. PATENT DOCUMENTS

| | | | |
|---|---|---|---|
| 10,340,825 B2* | 7/2019 | Aoki | ....................... H02P 6/182 |
| 2017/0272011 A1 | 9/2017 | Fedigan et al. | |
| 2019/0031046 A1 | 1/2019 | Secrest et al. | |
| 2019/0058422 A1 | 2/2019 | Park et al. | |

OTHER PUBLICATIONS

German-language Written Opinion (PCT/ISA/237) issued in PCT Application No. PCT/EP2020/062396 dated Jul. 20, 2020 (eight (8) pages).

German-language Office Action issued in German Application No. 10 2019 115 787.0 dated Mar. 17, 2020 with English translation (nine (9) pages).

* cited by examiner

METHOD FOR DETERMINING THE ANGLE OF THE ROTOR OF AN ELECTRIC MOTOR CONTROL UNIT AND VEHICLE

BACKGROUND AND SUMMARY OF THE INVENTION

The invention relates to a method for determining the angle of the rotor of an electric motor, to a control unit and to a vehicle.

Electric motors are used in vehicles as a drive, in order to convert electrical energy into propulsion. For this, a varying magnetic field is applied to the stator, so that the magnetic rotor rotates in the magnetic field of the stator. The torque and the output of the motor are in this case dependent on the rotational speed of the rotor, and consequently on the magnetic field applied to the stator.

In order to ensure an efficient transformation of the electrical energy into mechanical propulsion, a certain angle offset or phase offset between the applied magnetic field and the rotor is necessary. Therefore, a precise positional determination of the rotor of the electric motor is necessary, that is to say a precise determination of the angle of the rotor of the electric motor.

It is therefore the object of the invention to allow a precise determination of the angle of the rotor of the electric motor.

The object is achieved by a method for determining the angle of the rotor of an electric motor that has a rotor and a stator with at least one coil, in particular three coils. The method comprises the following steps:
- obtaining a first rotor position signal from a rotor position sensor by a control unit, the rotor position signal comprising a position value along a first of two directions in the plane of rotation of the rotor and the first rotor position signal comprising a number of orders,
- determining the angular velocity of the electric motor at least on the basis of the first rotor position signal by way of an angular velocity module of the control unit,
- determining a first base signal on the basis of the determined angular velocity and the first rotor position signal by way of a first filter module of the control unit, and
- determining the angle of the rotor at least on the basis of the determined first base signal by way of an angle module of the control unit.

The invention is based on the basic concept that the rotor position signal is evaluated in two steps. The rotor position signal is typically a superpositioning of a sinusoidal contribution, which originates from the rotational movement of the rotor, and an error term under which all of the signal components that do not originate from the rotation of the rotor are subsumed. The error term is also mostly dependent on the temperature and the age of the rotor position sensor, so that it is variable and can falsify the determination of the rotor angle. In a first step, the angular velocity is derived directly from the rotor position signal and, in a second step, a base signal is filtered out of the rotor position signal, whereby the angle of the rotor is determined. The analysis of the rotor position signal in two steps allows a precise but resource-saving determination of the angle of the rotor of the electric motor.

The rotor position sensor generally provides an analog rotor position signal, which is sampled with a certain sampling interval. Accordingly, the rotor position signal obtained by the control unit is discrete. The sampling interval is for example predetermined by the rotor position sensor and/or the control unit.

The rotor may be magnetic. For example, the rotor has at least one permanent magnet. Permanently excited electric motors, that is to say electric motors of which the rotor is always magnetic, are among the most efficient electric motors.

In one configuration of the invention, the method comprises the following further steps:
- obtaining a second rotor position signal from a rotor position sensor by the control unit, the rotor position signal comprising a position value along the second of the two directions in the plane of rotation of the rotor and the second rotor position signal comprising a number of orders,
- determining a second base signal on the basis of the determined angular velocity and the second rotor position signal by way of a second filter module of the control unit, and
- determining the angle of the rotor at least on the basis of the determined first base signal and the determined second base signal by way of an angle module of the control unit.

Correspondingly, both position values of the rotor position signal along both directions of the plane of rotation of the rotor are used to determine the angle of the rotor. This increases the accuracy of the angular determination.

The rotor position signals are sampled with high resolution, since the sampling interval of the rotor position sensor is very small compared to the period of the rotation of the rotor. Thus, the rotor position signals can be described as a real trigonometric series.

In one configuration of the invention, the angular velocity is determined on the basis of the first rotor position signal and the second rotor position signal. Consequently, the angular velocity is determined more accurately.

The first base signal and/or the second base signal may have just one fundamental oscillation.

For example, the fundamental oscillation of the first base signal and the fundamental oscillation of the second base signal are phase-shifted, in particular phase-shifted by 90°.

The fundamental oscillations can consequently be determined with simple trigonometric functions, for example with sine and cosine functions, thereby allowing a rapid determination of the angle of the rotor of the electric motor.

It is conceivable that the angle module determines the angle by way of an arc tangent, in particular an arc tangent function with two variables. In this way, the angle can be determined directly from the first base signal and the second base signal.

For example, the angle is determined by way of an atan2 function, which is for example implemented in MATLAB.

In one configuration of the invention, the first rotor position signal and/or the second rotor position signal is/are preprocessed by way of a preprocessing module before they are fed to the respective filter module and/or the angular velocity module. The preprocessing module fits a real trigonometric series to the respective rotor position signal and transfers the real trigonometric series as the respective rotor position signal to the respective filter module and/or the angular velocity module. As a result, the input of the filter module and/or the angular velocity module is well-defined.

The electric motor may be controlled by the control unit at least on the basis of the determined angle, in particular by the following steps:
- determining at least one current correction value for the at least one coil by the control unit at least on the basis of the determined angle and/or the angular velocity of the rotor, and adapting the current flow through the at least one coil on the basis of the at least one current correction value by the control unit.

In this way, the electric motor is controlled directly by the determined angle and/or the determined angular velocity, so that rapid and exact control is provided.

The first rotor position signal and/or the second rotor position signal may be provided by a magnetoresistive rotor position sensor. Magnetoresistive sensors are robust, small and very energy-saving.

In one configuration of the invention there is exactly one magnetoresistive rotor position sensor, which provides the first rotor position signal and the second rotor position signal. To be more precise, the rotor position sensor provides the projection of the rotational movement of the rotor on a unit circle along two orthogonal axes, that is to say the sine and cosine values of the rotational movement of the rotor.

The method according to the invention is not restricted to magnetoresistive rotor position sensors. Generally, any rotor position sensor that provides the projection of the rotational movement of the rotor along at least one direction is conceivable.

For example, the rotor position sensor is a Hall sensor, an eddy current sensor, an optical incremental encoder, a resolver and/or a hardware demodulator.

The first filter module and/or the second filter module may apply a filter to the respective rotor position signal. This allows efficient determination of the base signal.

For example, the filter is based on a phase control loop and/or has the effect of a low-pass filter, in order to determine the respective base signal.

It is conceivable that the filter module determines the base signal by way of a cost function and the parameters of the base signal by way of the gradient method, whereby the filter module is based on an improved phase control loop.

In one configuration of the invention, the filter is described by the following equations:

$$\frac{dA_i(t)}{dt} = \mu_{1i} \cdot e_i(t) \cdot \sin(\phi_i(t)),$$

$$\frac{d\omega_i(t)}{dt} = \mu_{2i} \cdot e_i(t) \cdot \cos(\phi_i(t)),$$

$$\frac{d\phi_i(t)}{dt} = \mu_{2i} \cdot \mu_{3i} \cdot e_i(t) \cdot \cos(\phi_i(t)) + \omega_{0i},$$

$$G_i(t) = A_i(t) \cdot \sin(\phi_i(t)),$$

$$e_i(t) = P(t) - G_i(t), \text{ and}$$

$$\phi_i(t) = \omega_{0i} \cdot t + \delta_i.$$

In the above equations, i is the order of oscillation with the fundamental frequency $\omega_0$, $\mu_{1i}$, $\mu_{2i}$ and $\mu_{3i}$ are gain factors, $A_i$ is the amplitude of oscillations, $\delta_i$ is a phase offset, $\phi_i(t)$ the time-dependent angle of the rotor, $w_i(t)$ is the time-dependent angular velocity, $e_i(t)$ is the error function, $P(t)$ is the rotor position signal and $G_i(t)$ is the fundamental oscillation and the base harmonics of the base signal $G(t) = \Sigma_{i=1}^{n} G_i(t)$, in particular is the base signal $G(t)=A_1(t) \cdot \sin(\phi_1(t))$.

In this case, the parameters of the filter are given by i, $\mu_{1i}$, $\mu_{2i}$, $\mu_{3i}$, $A_i$ and $\delta_i$. Since both the base signal and unwanted signals are described by the above parameters, the filter allows a determination of the base signal even in situations in which the properties of the rotor position sensor have changed.

The parameters of the filter may describe an offset, a phase offset, a gain error and/or harmonic amplitudes, and therefore indicate unwanted contributions.

For example, orders with i>3, in particular i>1, are suppressed. This allows rapid filtering of the base signal.

In other words, the orders with i>3, in particular i>1, are therefore ignored.

In order to reduce the overall number of parameters of the filter, and thereby increase the speed of the filter, it can be assumed when applying the filter that the amplitude $A_1$ of the fundamental oscillation of the first rotor position signal and/or of the second rotor position signal is equal to 1, and/or that the filter obtains the determined angular velocity as a parameter.

It is generally also conceivable that the amplitude $A_1$ of the fundamental oscillation of the first rotor position signal and/or of the second rotor position signal is already known, for example from another measurement.

In one configuration of the invention, the filter is stored as a transfer function in the first filter module and/or in the second filter module. This allows efficient processing of the rotor position signal.

In order to obtain status information, the control unit may have a diagnostic module, the diagnostic module obtaining at least one parameter of the filter from the first filter module and/or from the second filter module. The at least one parameter is used for performing a diagnostic analysis of the electric motor, the rotor position sensor and/or the filter, in particular by a comparison of the at least one parameter with a predetermined threshold value.

For example, the overshooting or undershooting of the threshold value is registered as an error and a malfunction of the electric motor, the filter and/or the rotor position sensor is indicated by an error message of the control unit.

The object of the invention is also achieved by a control unit for a vehicle, the control unit being designed to carry out a method according to the invention. With regard to the advantages and features, reference is made to the explanations above with respect to the method according to the invention, which equally apply to the control unit.

In addition, the object is achieved by a vehicle with an electric motor, a rotor position sensor and a control unit according to the invention. The advantages and features already set out with respect to the method and the control unit are obtained.

Further features and advantages of the invention emerge from the following description and from the accompanying drawings, to which reference is made below.

DETAILED DESCRIPTION OF THE DRAWINGS

Figure 1:
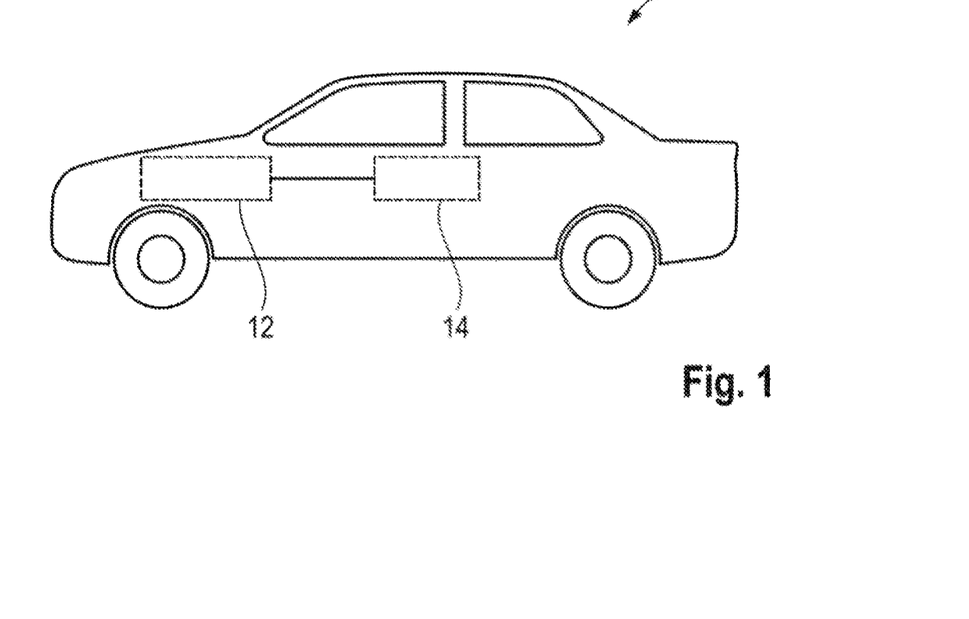
FIG. 1 shows a schematic side view of a vehicle according to embodiments of the invention with a control unit according to embodiments of the invention.

FIG. 1 shows a schematic side view of a vehicle 10. The vehicle 10 has an electric motor 12 and a control unit 14.

The electric motor 12 is connected to the wheels of the vehicle 10 and provides the propulsion of the vehicle 10.

The vehicle 10 may be an electric vehicle, so that the electric motor 12 is the only drive motor.

It is also conceivable that the vehicle 10 is a hybrid electric vehicle, according to which the propulsion of the vehicle 10 is provided by the electric motor 12 and an additional internal combustion engine.

Figure 2:
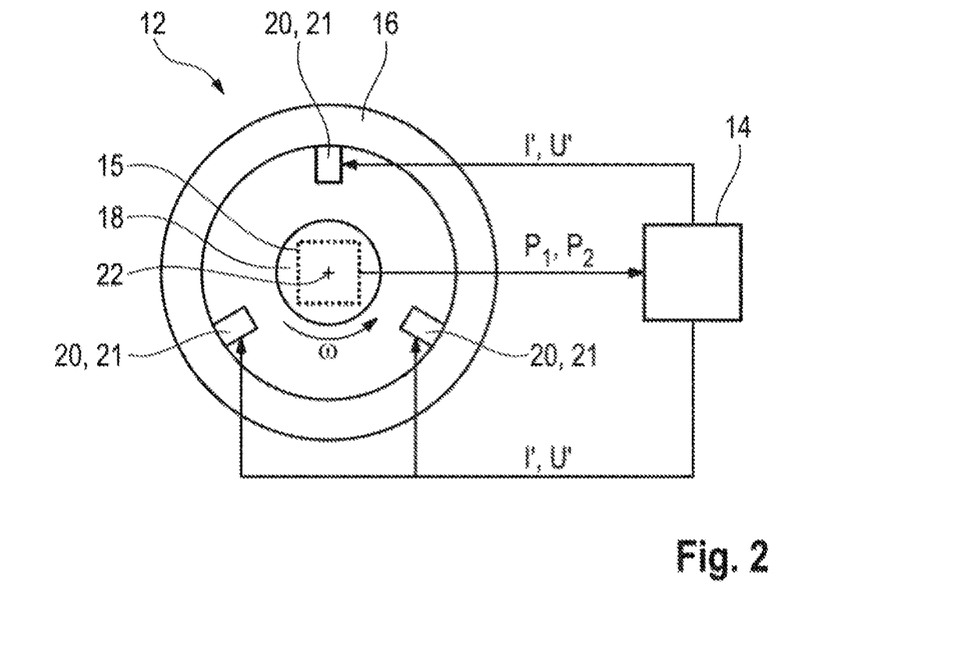
FIG. 2 shows a schematic block diagram of an electric motor and of the control unit according to the invention in a first embodiment.

The block diagram of FIG. 2 shows the electric motor 12, the control unit 14 and a rotor position sensor 15 in detail.

The electric motor 12 is for example a known synchronous three-phase machine and has a stator 16 and a rotor 18.

The stator 16 encloses the rotor 18 and has on its inner side, that is to say on the side of the stator 16 opposite from the rotor 18, three electromagnets 20. It goes without saying that a different number of electromagnets 20 is also conceivable.

The three electromagnets 20 are arranged offset in relation to one another at an angle of 120° and respectively generate a magnetic field if a voltage with a corresponding voltage value U is applied to the electromagnets 20. In this case, a corresponding current with a current value I flows through the electromagnets 20.

In the embodiment of FIG. 2, the electromagnets 20 are for example coils 21.

The rotor 18 is arranged rotatably about an axis of rotation 22 and is magnetic. For this, the rotor has for example permanent magnets (not shown).

If the electromagnets 20 of the stator 16 generate a corresponding magnetic field, the rotor 18 rotates about the axis of rotation 22 with an angular velocity w.

The rotor position sensor 15 is a magnetoresistive sensor, the sensing surface of which is arranged perpendicular to the axis of rotation 22 and which is at a distance from the rotor 18.

The rotor position sensor 15 measures the rotational movement of the rotor 18 contactlessly.

For this, the rotor position sensor 15 has for example magnetoresistive regions, the resistances of which change according to the orientation of the magnetic rotor 18.

To be more precise, the rotor position sensor 15 provides two rotor position signals $P_1$, $P_2$, which respectively have a position value along a direction in the plane of rotation 23 (FIG. 3) of the rotor 18. This is represented by way of example in the block diagram of FIG. 3.

Figure 3:
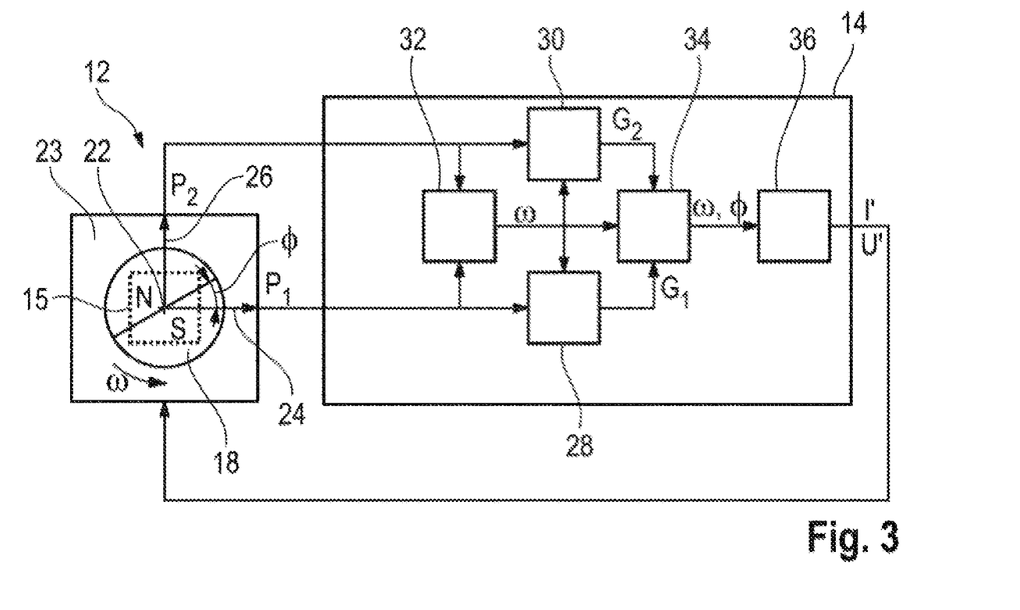
FIG. 3 shows a detailed block diagram of the electric motor and of the control unit according to the invention from FIG. 2.

The magnetic effect of the rotor 18 is represented in FIG. 3 by a north pole N and a south pole S. The rotation of the rotor 18 about the axis of rotation 22 defines a plane of rotation 23, which is determined by two mutually orthogonal directions 24, 26.

At the point in time represented in FIG. 3, the rotor 18, to be more precise the north pole N and the south pole S, has an angle ϕ with respect to the first direction 24.

The rotor position sensor 15 determines the projection of the rotational movement into the first and second directions 24, 26, according to which the rotor position sensor 15 provides a position value along the first direction 24 for the first rotor position signal $P_1$ and a position value along the second direction 24 for the second rotor position signal $P_2$.

The rotation of the rotor 18 may be understood as a vector rotating about the axis of rotation 22, so that the first rotor position signal $P_1$ is the cosine value of the position of the vector and the second rotor position signal $P_2$ is the sine value of the position of the vector.

The arrangement of the rotor position sensor 15 should be understood as only given by way of example. It goes without saying that the rotor position sensor 15 may also be arranged in or on a shaft of the rotor 18.

As represented in FIG. 2, the rotor position sensor 15 transfers the rotor position signals $P_1$, $P_2$ to the control unit 14, which subsequently determines the angle ϕ and the angular velocity w of the rotor 18. Based on the angle ϕ and the angular velocity w of the rotor 18, the control unit 14 determines a current correction value I' and a corresponding voltage correction value U' for the electromagnets 20, which are subsequently applied to the electromagnets 20, as represented by the arrows in FIG. 2.

It is generally of course conceivable that the control unit 14 determines different current correction values I' and voltage correction values U' for the three coils 21. For reasons of overall clarity, however, only one current correction value I' and one voltage correction value U' is assumed here for all coils 21.

For example, the control unit 14 uses a field-oriented control to determine current correction values I' and/or voltage correction values U'.

To be more precise, the control unit 14 uses one method to determine the angle ϕ and the angular velocity w of the rotor 18.

The control unit 14 has a first filter module 28, a second filter module 30 separate from the first filter module 28, an angular velocity module 32, an angle module 34 and a current value correction module 36.

In a first step, the control unit obtains the rotor position signals $P_1$ and $P_2$ of the rotor position sensor 15. The rotor position signals $P_1$ and $P_2$ have in this case a number of orders of the rotational velocity w and disruptive terms of the measurement by the rotor position sensor 15.

The first rotor position signal $P_1$ is transferred to the first filter module 28 and the angular velocity module 32 and the second rotor position signal $P_2$ is transferred to the second filter module 28 and the angular velocity module 32.

Subsequently, the angular velocity model 32 determines the angular velocity w of the rotation of the rotor 18, for example on the basis of the change over time of one or both rotor position signals $P_1$, $P_2$.

The determined angular velocity w is subsequently transferred to the first filter module 28, the second filter module 30 and the angle module 34.

The first filter module 28 in this case filters a first base signal $G_1$ out of the first rotor position signal $P_1$ and the second filter module 30 filters a second base signal $P_2$ out of the second rotor position signal $P_2$.

For this, the first filter module 28 and the second filter module 30 respectively use a filter 38, which is based on a phase control loop. The filter 38 is represented in the block diagram of FIG. 4.

Figure 4:
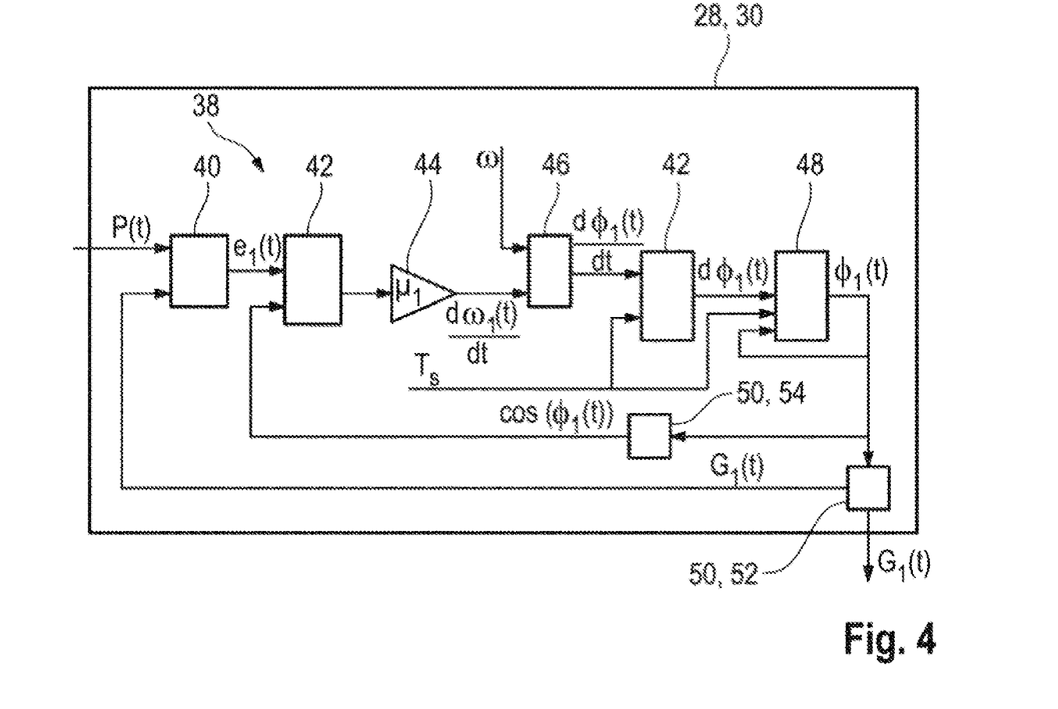
FIG. 4 shows a block diagram of a filter module of the control unit according to invention from FIG. 3.

The filter 38 has a comparison module 40, two multiplication modules 42, an amplification module 44, an addition module 46, a counting module 48 and two trigonometry modules 50.

The way in which the filter 38 functions is explained below on the basis of an example. For this, it is assumed that the rotor position signals $P_1$, $P_2$ are transferred to the filter module 28, 30 as a time-dependent rotor position signal P(t).

The time-dependent rotor position signal P(t) is in this case made up of the movement $x_1(t) = A_1 \sin(\omega \cdot t + \delta_1)$ of the rotor 18, where $\delta_1$ is the starting angle of the rotor 18 at the point in time t=0 and the rotor angle is given by $\phi(t) = \omega \cdot t + \delta_1$, and an error term $x_F(t)$, i.e.

$$P(t) = x_1(t) + x_F(t).$$

The error term $x_F(t)$ is the sum of the undesired signals, such as harmonics, offsets, orthogonality errors, i.e. phase offsets between the rotor position signals ($P_1$, $P_2$) and/or gain errors.

If the error term $x_F(t)$ is not taken into account in the analysis, inaccuracies may occur in the determination of the angle of the rotor 18 of the electric motor 12, so that the electric motor 12 does not run true and/or has harmonic contents.

The rotor position signal $P(t)$ can be represented for example as a real trigonometric series:

$$P(t) = C + x_1(t) + \sum_{i=2}^{\infty} A_i \sin(i \cdot \omega \cdot t + \delta_i), \quad (1)$$

with amplitudes $A_i$ and phase offsets $\delta_i$ of the harmonics i and an offset C.

The filter 38 then filters the base signal $G(t)$ out of the rotor position signal $P(t)$ $$G(t) = \sum_{i=1}^{n} G_i(t) + C = \sum_{i=1}^{n} A_i(t) \cdot \sin(\phi_i(t)) + C,$$

where $\phi_i(t) = \omega_i \cdot t + \delta_i$

It should be noted that the base signal only has a finite number of harmonics.

In particular, the harmonics with high i values are filtered out, so that the filter 38 acts as a low-pass filter.

The parameters $\Pi$ of the base signal, that is to say $A_i$, $\phi_i$, $\delta_i$, $\omega_i$, C, can be determined by forming a cost function $J(t, \pi)$ $$J(t,\Pi) = \tfrac{1}{2}[P(t) - G(t,\Pi)]^2$$

and minimizing the cost function by way of the gradient method, so that the temporal derivative of the parameters $\Pi$ is given by $$\frac{d\Pi(t)}{dt} = -\mu \frac{\partial}{\partial \Pi} J(t, \Pi),$$

where $\mu$, are the gain factors or increments of the gradient method. Accordingly, the following equations are obtained for the filter 38:

$$\frac{dA_i(t)}{dt} = \mu_{1i} \cdot e_i(t) \cdot \sin(\phi_i(t)), \quad (2)$$

$$\frac{d\omega_i(t)}{dt} = \mu_{2i} \cdot e_i(t) \cdot \cos(\phi_i(t)), \quad (3)$$

$$\frac{d\phi_i(t)}{dt} = \mu_{2i} \cdot \mu_{3i} \cdot e_i(t) \cdot \cos(\phi_i(t)) + \omega_{0i}, \quad (4)$$

$$G_i(t) = A_i(t) \cdot \sin(\phi_i(t)), \quad (5)$$

$$e_i(t) = P(t) - G_i(t) \text{ and} \quad (6)$$

$$\phi_i(t) = \omega_i \cdot t + \delta_i. \quad (7)$$

According to embodiments of the invention, harmonics i>3, in particular harmonics i>1, are suppressed and the amplitude $A_1(t)=1$ set.

The way in which the filter 38 functions is explained below by way of example for a base signal $G(t)$ of the form $G(t)=G_1(t)$ where $A_1(t)=1$, i.e.

$$G(t) = \sin(\phi_1(t)).$$

The base signal $G(t)$ therefore has just one fundamental oscillation.

Typically, the base signals $G(t)$ of the first rotor position signal $P_1$ and of the second rotor position signal $P_2$ are phase-shifted.

In particular, the fundamental oscillations $G_1(t)$ are phase-shifted by 90°, so that the fundamental oscillation $G_1(t)$ of the first rotor position signal $P_1$ is given by $G_1(t)=\sin(\phi_1(t))$ and that of the second rotor position signal $P_2$ is given by $G_1(t)=\cos(\phi_1(t))$.

In the filter 38 of FIG. 4, both the rotor position signal $P(t)$ and the filtered base signal $G_1(t)$ are fed to the comparison module 40 as an input signal.

The comparison module 40 uses this to determine the error function $e_1(t)=P(t)-G_1(t)$ in accordance with equation (6) and transfers it to the multiplication module 42, which multiplies the error function $e_1(t)$ by $\cos(\phi_1(t))$.

The product of the error function $e_1(t)$ and $\cos(\phi_1(t))$ is subsequently amplified in the application module 44 with the gain factor $\mu$. In accordance with equation (3), this then gives the temporal derivative of the angular velocity $$\frac{d\omega_1(t)}{dt},$$

i.e. the change over time of the angular velocity w.

The filter 38 also obtains the angular velocity w determined from the angular velocity model 32, so that the change over time of the angular velocity $$\frac{d\omega_1(t)}{dt}$$

is added to the angular velocity w, in order to obtain in accordance with equation (4) the change over time of the angle $$\frac{d\phi_1(t)}{dt}.$$

It is generally conceivable that the signal $$\frac{d\omega_1(t)}{dt}$$

is additionally amplified by a further gain factor $\mu$.

Furthermore, it is possible to determine the angular velocity w from the integration of the temporal derivative $$\frac{d\omega_1(t)}{dt}.$$

The filter 38 of FIG. 4 is however designed for speed, so that it is intended that the fewest possible computational steps are performed. Accordingly, the angular velocity w of the angular velocity module 32 is used.

Following that, the incremental change $d\phi_1(t)$ of the angle $\phi_1(t)$ is determined by the multiplication of the change over time of the angle $$\frac{d\phi_1(t)}{dt}$$

by the sampling interval Ts of the rotor position sensor 15 in the second multiplication module 42.

The incremental change $d\phi_1(t)$ s finally added to the angle $\phi_1(t)$ of the previous iteration of the filter 38 in the counting module 48. For this, the output of the counting module 48 is connected to one of its inputs.

Finally, the counting module 48 transfers the angle $\phi_1(t)$ to the two trigonometry modules 50.

One trigonometry module 50 is in this case a sine module 52, which forms the sine value of the angle $\phi_1(t)$ and thereby determines the base signal $G_1(t)$. The other trigonometry module 50 is a cosine module 54, which forms the cosine value of the angle $\phi_1(t)$ and transfers it to the first multiplication module 42.

FIG. 4 therefore shows how the filter 38 filters the fundamental oscillation $G_1(t)$ out of the rotor position signal P(t). In this case, the filter 38 is stored as a transfer function in the control unit 14.

For example, the control unit 14 comprises a MATLAB Simulink implementation of the filter 38 analogous to the block diagram of FIG. 4.

Generally, the filter 38 of the first filter module 28 filters the base signal $G_1$ out of the first rotor position signal $P_1$ and the filter 38 of the second filter module 30 filters the second base signal $G_2$ out of the second rotor position signal $P_2$.

As represented in FIG. 3, the first base signal $G_1$ and the second base signal $G_2$ are transferred to the angle module 34 of the control unit 14, which determines from the first base signal $G_1$ and the second base signal $G_2$ the angle $\phi$ of the rotor 18.

For this, the angle module 34 calculates for example the arc tangent of the fundamental oscillations $G_{1,1}(t)$ of the first base signal $G_1$ and of the fundamental oscillations $G_{1,2}(t)$ of the second base signal $G_2$.

$$\phi(t) = \tan^{-1}\left(\frac{G_{1,1}(t)}{G_{1,2}(t)}\right) = \tan^{-1}\left(\frac{\sin(\phi_1(t))}{\cos(\phi_1(t))}\right).$$

Subsequently, both the angular velocity w and the angle $\phi$ are transferred from the angle module 34 to the current-value correction module 36.

The current-value correction model 36 determines a current correction value I' and a corresponding voltage correction value U' on the basis of the angular velocity w and the angle $\phi$.

Finally, the control unit 14 adapts the current flow through at least one electromagnet 20 of the electric motor 12 (FIG. 2) on the basis of the determined current correction value I'.

For example, the control unit 14 controls the at least one electromagnet 20 in such a way that a current with the current correction value I' flows through the electromagnet 20.

Figure 5:
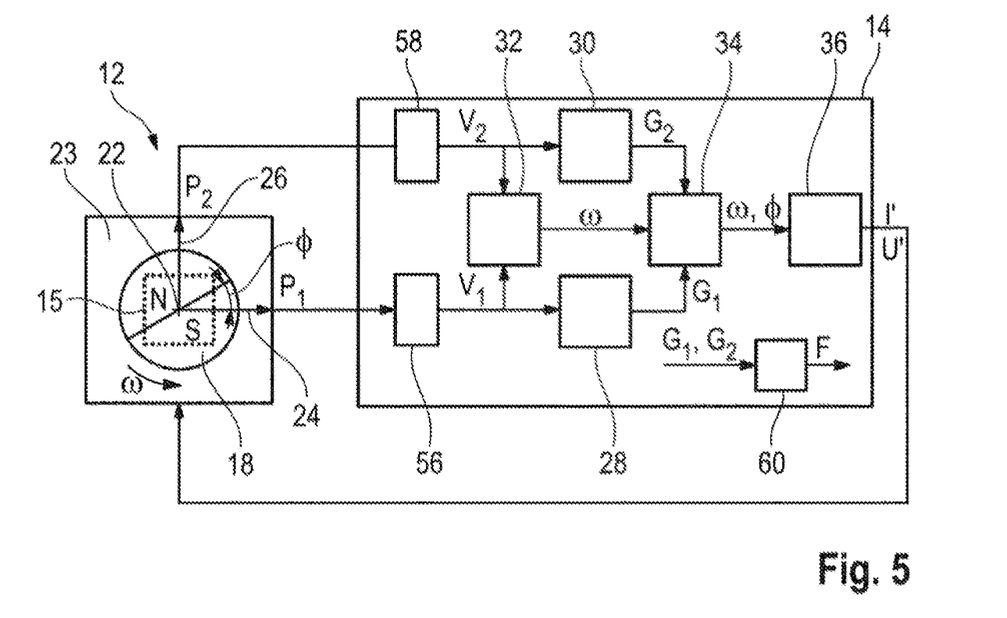
FIG. 5 shows a schematic block diagram of the electric motor and of a control unit according to the invention in a second embodiment.

In FIG. 5, a block diagram of a second embodiment of the control unit 14 is shown. The second embodiment corresponds substantially to the first embodiment, so that only the differences are discussed below. Components that are the same or functionally the same are provided with the same designations.

As a difference from the first embodiment, the control unit 14 of FIG. 5 has a first preprocessing module 56, a second preprocessing module 58 and a diagnostic module 60.

Furthermore, the determined angular velocity is not transferred to the filter modules 28, 30 but only to the angle module 34.

The first preprocessing model 56 generates a first preprocessed rotor position signal $V_1$ from the first rotor position signal $P_1$.

For example, the first preprocessing model 56 fits the real trigonometric series of the equation (1) to the first rotor position signal $P_1$.

By analogy, the second preprocessing module 58 generates a second preprocessed rotor position signal $V_2$ from the second rotor position signal $P_2$.

The preprocessed rotor position signals $V_1$, $V_2$ are then transferred in a way corresponding to the first embodiment to the first filter module 28, the second filter model 30 and the angular velocity module 32.

The diagnostic module 60 obtains the first base signal $G_1$ of the first rotor position signal $P_1$ and the second base signal $G_2$ of the second rotor position signal $P_2$ and performs a diagnostic analysis of the electric motor 12, the rotor position sensor 15 and/or the filter 38 on the basis of the signals transmitted.

To be more precise, the diagnostic module 60 obtains the parameters, for example the harmonic amplitudes $A_i$, the phase offsets $\delta_i$ and/or the offsets $C_1$ from the first and/or second filter module 28, 30 and generates an error message F if one of the parameters overshoots or undershoots a threshold value predetermined for this parameter.

It goes without saying that the various features of the two embodiments can be combined with one another as desired. In particular, the features listed as differences with respect to the second embodiment are independent and may also be present in various ways in the first embodiment.

In particular, the first and second embodiments each use both rotor position signals $P_1$, $P_2$.

What is claimed is:
1. A method for determining an angle of a rotor of an electric motor that has a rotor and a stator with at least one coil, the method comprising:
obtaining a first rotor position signal from a rotor position sensor by a control unit, the first rotor position signal comprising a position value along a first of two directions in a plane of rotation of the rotor, and the first rotor position signal comprising a first number of orders,
determining an angular velocity of the electric motor at least based on the first rotor position signal by using an angular velocity module of the control unit,
determining a first base signal based on the determined angular velocity and the first rotor position signal by using a first filter module of the control unit,
determining the angle of the rotor based on at least the determined first base signal by using an angle module of the control unit,
obtaining a second rotor position signal from the rotor position sensor by the control unit, the second rotor position signal comprising a position value along a second of the two directions in the plane of rotation of the rotor, and the second rotor position signal comprising a second number of orders, determining a second base signal based on the determined angular velocity and the second rotor position signal by using a second filter module of the control unit, and determining the angle of the rotor based on at least the determined first base signal and the determined second base signal by using the angle module of the control unit.

2. The method according to claim 1, wherein at least one of the first base signal or the second base signal has just one fundamental oscillation.

3. The method according to claim 2, wherein a fundamental oscillation of the first base signal and a fundamental oscillation of the second base signal are phase-shifted.

4. The method according to claim 3, wherein the fundamental oscillation of the first base signal and the fundamental oscillation of the second base signal are phase-shifted.

5. The method according to claim 1, wherein the angle module determines the angle by using an arc tangent function with two variables.

6. The method according to claim 1, wherein:
at least one of the first rotor position signal or the second rotor position signal is preprocessed by a preprocessing module before being fed to at least one of a respective filter module or the angular velocity module, and
the preprocessing module fits a real trigonometric series to the at least one of the first rotor position signal or the second rotor position signal, and transfers the real trigonometric series as the at least one of the first rotor position signal or the second rotor position signal to at least one of the respective filter module or the angular velocity module.

7. The method according to claim 1, wherein the electric motor is controlled by the control unit at least based on the determined angle by:
determining at least one current correction value for the at least one coil by the control unit at least based on at least one of the determined angle or the angular velocity of the rotor, and
adapting a current flow through the at least one coil based on the at least one current correction value by the control unit.

8. The method according to claim 1, wherein at least one of the first rotor position signal or the second rotor position signal is provided by a magnetoresistive rotor position sensor.

9. The method according to claim 1, wherein at least one of the first filter module or the second filter module applies a filter to a respective rotor position signal, in order to generate a respective base signal.

10. The method according to claim 9, wherein the filter at least one of is based on a phase control loop or has an effect of a low-pass filter.

11. The method according to claim 10, further comprising assuming, when applying the filter, that at least one of:
the amplitude $A_1$ of the fundamental oscillation $G_1(t)$ of at least one of the first rotor position signal or the second rotor position signal is known, or
the filter obtains the determined angular velocity as a parameter.

12. The method according to claim 10, wherein the filter is stored as a transfer function in at least one of the first filter module or the second filter module.

13. The method according to claim 10, wherein:
the control unit has a diagnostic module,
the diagnostic module obtains at least one parameter of the filter from at least one of the first filter module or the second filter module, and the at least one parameter is used for performing a diagnostic analysis of at least one of the electric motor, the rotor position sensor, or the filter.

14. The method according to claim 13, wherein the diagnostic analysis is performed by a comparison of the at least one parameter with a predetermined threshold value.

15. The method according to claim 9, wherein the filter is described by the following equations:

$$\frac{dA_i(t)}{dt} = \mu_{1i} \cdot e_i(t) \cdot \sin(\phi_i(t)),$$

$$\frac{d\omega_i(t)}{dt} = \mu_{2i} \cdot e_i(t) \cdot \cos(\phi_i(t)),$$

$$\frac{d\phi_i(t)}{dt} = \mu_{2i} \cdot \mu_{3i} \cdot e_i(t) \cdot \cos(\phi_i(t)) + \omega_{0i},$$

$$G_i(t) = A_i(t) \cdot \sin(\phi_i(t)),$$

$$e_i(t) = P(t) - G_i(t),$$

$$\phi_i(t) = \omega_i \cdot t + \delta_i,$$

where i is an order of the oscillation with a fundamental frequency $w_0$, $\mu_{1i}$, $\mu_{2i}$ and $\mu_{3i}$ are gain factors, $A_i$ are amplitudes of the oscillations, $\delta_i$ is a phase offset, $\phi_i(t)$ is a time-dependent angle of the rotor, $e_i(t)$ is an error function, $P(t)$ is a rotor position signal, and $G_i(t)$ is a fundamental oscillation and harmonics of the base signal $G(t)=\Sigma_{i=1}^n y_i(t)C$ of the filter.

16. The method according to claim 15, wherein orders of i>3 are at least one of suppressed or negligible.

17. The method according to claim 1, wherein the at least one coil comprises three coils.

18. A control unit for a vehicle, wherein the control unit is configured to perform a method for determining an angle of a rotor of an electric motor that has a rotor and a stator with at least one coil, the method comprising:
obtaining a first rotor position signal from a rotor position sensor by a control unit, the first rotor position signal comprising a position value along a first of two directions in a plane of rotation of the rotor, and the first rotor position signal comprising a first number of orders,
determining an angular velocity of the electric motor at least based on the first rotor position signal by using an angular velocity module of the control unit,
determining a first base signal based on the determined angular velocity and the first rotor position signal by using a first filter module of the control unit,
determining the angle of the rotor based on at least the determined first base signal by using an angle module of the control unit,
obtaining a second rotor position signal from the rotor position sensor by the control unit, the second rotor position signal comprising a position value along a second of the two directions in the plane of rotation of the rotor, and the second rotor position signal comprising a second number of orders,
determining a second base signal based on the determined angular velocity and the second rotor position signal by using a second filter module of the control unit, and
determining the angle of the rotor based on at least the determined first base signal and the determined second base signal by using the angle module of the control unit.

19. A vehicle, comprising:
an electric motor, a rotor position sensor, and
a control unit according to claim 18.

\* \* \* \* \*